United States Patent
Frantz et al.

(10) Patent No.: US 7,556,442 B2
(45) Date of Patent: Jul. 7, 2009

(54) APPARATUS AND METHOD FOR A SMART IMAGE-RECEPTOR UNIT

(75) Inventors: Gene A. Frantz, Sugar Land, TX (US); Pascal Dorster, Houston, TX (US)

(73) Assignee: Texas Instruments Incorporated, Dallas, TX (US)

(*) Notice: Subject to any disclaimer, the term of this patent is extended or adjusted under 35 U.S.C. 154(b) by 421 days.

(21) Appl. No.: 11/438,772

(22) Filed: May 23, 2006

(65) Prior Publication Data
US 2006/0269274 A1 Nov. 30, 2006

Related U.S. Application Data

(60) Provisional application No. 60/684,204, filed on May 24, 2005.

(51) Int. Cl.
*G03B 17/00* (2006.01)
*H04N 5/225* (2006.01)

(52) U.S. Cl. ............... 396/529; 348/373; 257/428

(58) Field of Classification Search ......... 396/301–304, 396/529, 429; 348/373–376, 14.02, 335, 348/360, E5.025, E5.026, E5.028, E7.079; 359/808, 819; 455/575.3; 257/428, 431–433
See application file for complete search history.

(56) References Cited

U.S. PATENT DOCUMENTS 7,139,473 B2 * 11/2006 Shimano et al. ............ 396/73

* cited by examiner

*Primary Examiner*—Reena Aurora
(74) *Attorney, Agent, or Firm*—Mirna G. Abyad; Wade J. Brady, III; Frederick J. Telecky, Jr.

(57) ABSTRACT

In an optical image acquisition and information transmission system, the system components can be fabricated, according to a first implementation, in a stack positioned on a circuit board. According to a second implementation, the system components are fabricated on a single substrate using the same semiconductor processes for each component. Both implementations result in better performance parameters. These systems are particularly useful as control devices wherein information resulting from processing the acquired image rather than the image itself is transmitted.

12 Claims, 2 Drawing Sheets

APPARATUS AND METHOD FOR A SMART IMAGE-RECEPTOR UNIT

This application claims the benefit of Provisional Application Ser. No. 60/684,204, entitled "Smart Imager" and filed on May 24, 2005.

BACKGROUND OF THE INVENTION

1. Field of the Invention

This invention relates generally to the apparatus for processing electronically-captured optical images, and more particularly, to modifications to the system that result in improvements in speed, processing power, power consumption, and reduced complexity in the fabrication. A self-contained unit is described that can be used as a small stand-alone optical monitoring unit.

2. Background of the Invention

The importance in modern technology for a stand-alone optical processing and transmitting unit is evident from, for example, the popularity of cell phones to which have been added the capability of capturing and transmitting images. Referring to the FIG. 1, the components of an electronic apparatus for capturing and transmitting images according to the prior art is shown. A circuit board 10 has an image sensor unit 11 having photoreceptors for receiving optical images. The electronic signals of the image sensor unit 11 can be either applied to a processor unit 12 or applied directly to a memory unit 14. The processor 12, which controls the operation of the image sensor unit, can retrieve and store signal groups, including processed signal groups, in the memory unit 14. The processor unit 12 can forward signal groups to the wireless unit 15 for transmission. A power unit 19 provides power for the image sensor unit 11, the memory unit 14, the processor unit 12, and the wireless unit 15.

The system shown in FIG. 1 has been commercially successful. However, several problems have remained. For example, the power consumption is relatively high. Attempts to address this problem include providing "sleep" modes wherein portions of the systems are inactivated unless currently being used. In addition, the use of circuit boards requires long conducting paths that require additional power. The relatively long leads used with a circuit board limit the operating frequency. And the use of a plurality of components in a system complicates the fabrication of the device.

A need has therefore been felt for apparatus and an associated method having the feature of providing an optical image capture and transmission system with improved operating characteristics. It would be a more particular feature of the apparatus and associated method to provide a single image sensor/processor/memory unit in a stack configuration for use with an image acquisition and transmission system. It would be still another more particular object of the apparatus and associated method to provide an image acquisition and information transmission system in which all components are fabricated using a the same semiconductor process. It is a more particular object of the apparatus and associated method to fabricate an optical image acquisition and information transmission system using CMOS technology.

SUMMARY OF THE INVENTION

The aforementioned and other features are provided, according to the present invention by assembling providing a configuration for the typical image sensor unit, processor unit, memory unit, wireless unit and power unit, present in the prior art, that improves performance parameters of frequency response, power consumption, etc. for the optical acquisition and transmission system. According to one implementation, various components are fabricated in a stack, thereby improving the performance parameters. According to a second-implementation, many or all of the components are fabricated on a single substrate. In addition, the particular application for which the system is provided is not the transmission of an optical image, but rather the transmission of information derived from the acquired optical image. This reduces transmitted information.

Other features and advantages of present invention will be more clearly understood upon reading of the following description and the accompanying drawings and the claims.

BRIEF DESCRIPTION OF THE DRAWINGS

FIG. 2A illustrates a device for capturing and transmitting information derived from optical images according to a first implementation of the present invention; while

1. DETAILED DESCRIPTION OF THE FIGURES

Figure 1:
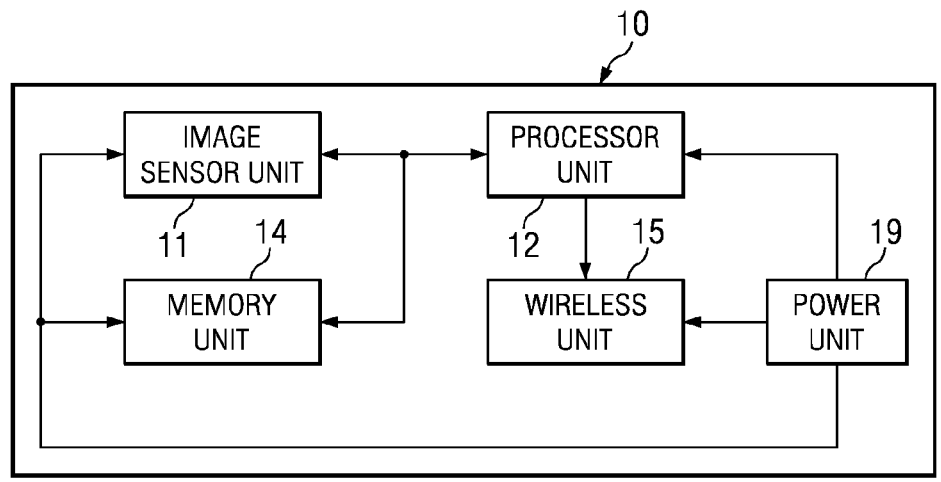
FIG. 1 illustrates a device for capturing and transmitting optical images according to the prior art.

FIG. 1 has been described with respect to the prior art.

Figure 2A:
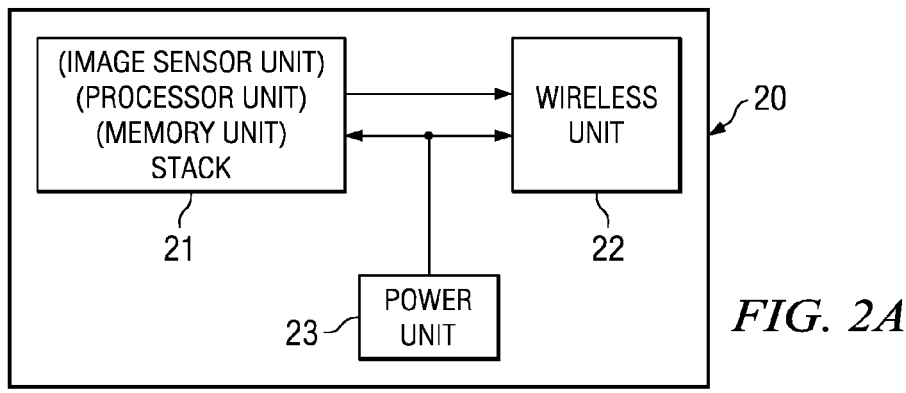

Referring next to FIG. 2A, a group of components on a circuit board includes a stack unit 21 having an image sensor unit and a memory unit/processor unit incorporated therein. The stack unit 21 is coupled to a wireless unit 22. A power unit provides the power for stack 21 and for wireless unit 22. The stack unit 21, the wireless unit 22, and the power unit 23 are coupled by conducting paths on circuit board 20.

Figure 2B:
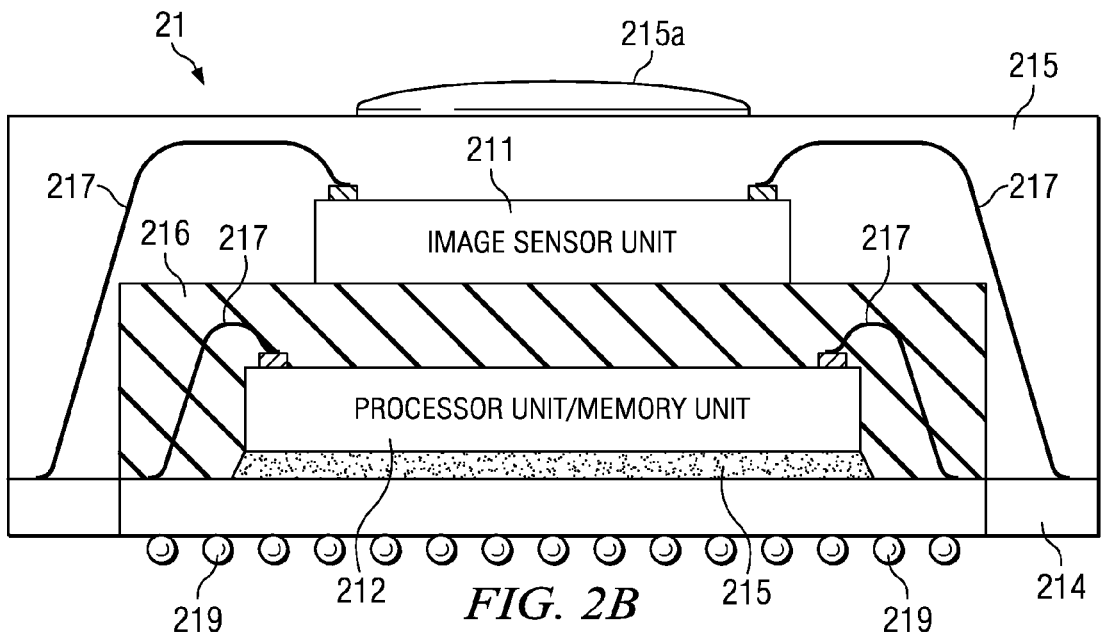
FIG. 2B illustrates a stack configuration.

Referring to FIG. 2B, a cross-section view of the stack unit 21 is shown. The active component of the stack unit 21 is shown. The image sensor unit 211 captures images from the surrounding environment. The images are controlled, processed and stored by the processor unit/memory unit 212. In the preferred embodiment, the processor unit and memory unit are combined. However, these components can be separated and can even be implemented on separate layers of the stack 21. The stack is fabricated on circuit board 214. An opaque and insulating dielectric separates the processing unit/memory unit (substrate) and the circuit board 214. An insulating opaque dielectric 216 separates the image sensor unit 211 and the processor memory unit 212. A transparent dielectric 215 encapsulates the active devices while permitting light to be received by the image sensor device 211. A lens 215a is fabricated for the image sensor unit as part of stack 21 in transparent dielectric 215. Conducting leads 217 electrically couple the image sensor unit, the processor/memory unit 212 and the circuit board 214. The circuit board 214 includes conducting pads 219 that permit the stack to be electrically connected to the circuit board 20 of FIG. 2A.

Figure 3:
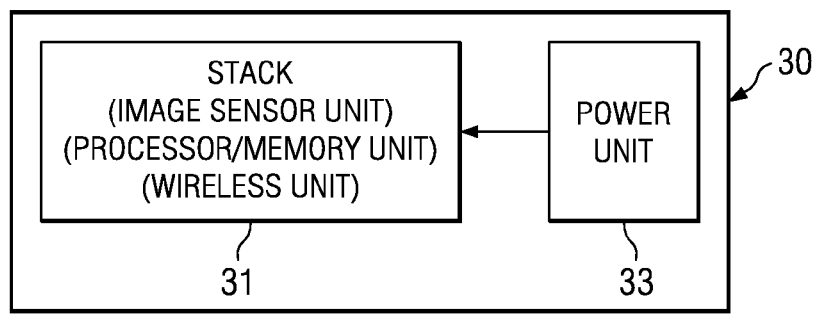
FIG. 3 illustrates a device for capturing and transmitting information derived from optical images according to a second implementation of the present invention.

Referring to FIG. 3, an implementation of a system similar to FIG. 2A is shown. The difference is that the wireless unit has been added to the stack 31, the stack already including the image sensor unit and the processor/memory unit. The wireless unit can be included on a separate substrate or can be included on an extended version of the substrates already present (i.e., shown in FIG. 2B). The advantages of system include a more compact configuration (permitting higher frequency operation and lower power consumption). The stack 31 includes conducting paths that facilitate the inter-connectability of the stack 31 components and to provide conducting paths to power unit 33.

Figure 4:
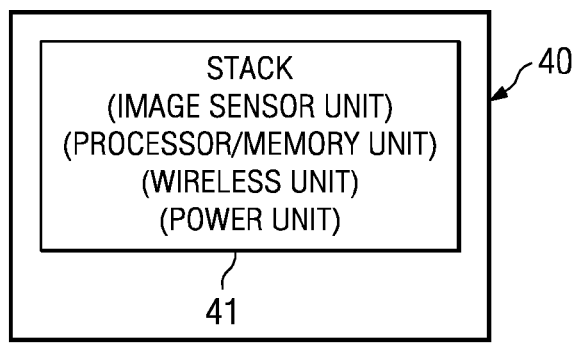
FIG. 4 illustrates a device for capturing and transmitting information derived from optical images according to a third implementation of the present invention.

Referring next to FIG. 4, the final step in assembling the components into a stack 41 is to include the power unit. With this change, the optical capture and transmission system is entirely assembled on the circuit board 40. Once gain, as illustrated in FIG. 2A, the circuit board can be used to facilitate the electrical coupling between the components of stack 41.

Figure 5:
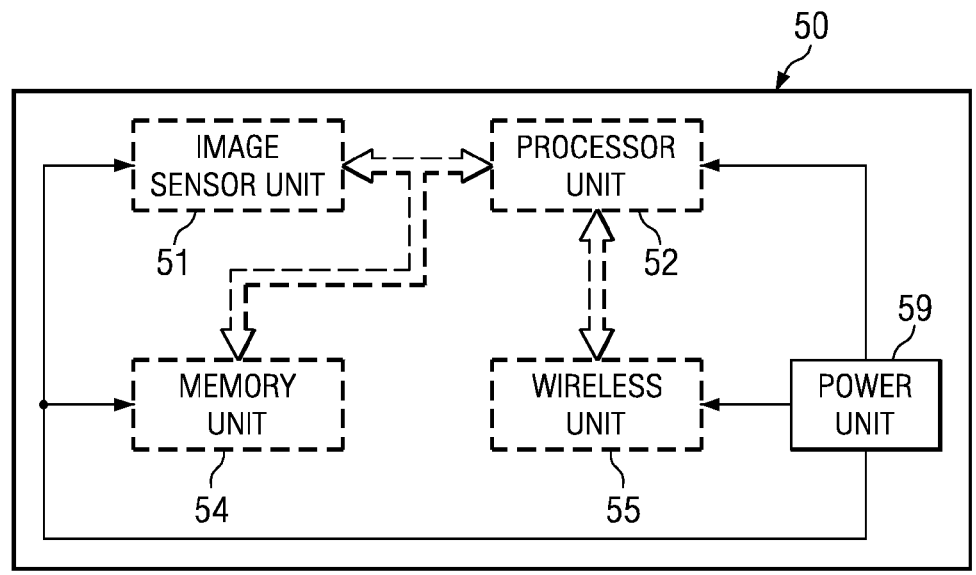
FIG. 5 illustrates a device for capturing and transmitting information derived from optical images according to a fourth embodiment of the present invention.

Referring next to FIG. 5, the fourth implementation of the device for capturing and transmitting information derived from optical images is shown. The connectivity of the components follows that of FIG. 1. The difference is that whereas the labeled components are connected by means of the conducting paths on a circuit board, in this implementation chip 50 is a substrate suitable for CMOS technology. All of the components on chip 50 can be implemented in CMOS technology. Therefore, the gates of the various components can be arranged with goals of minimizing the lengths of conducting paths.

2. OPERATION OF THE PREFERRED EMBODIMENT

One application for the implementations of present invention is to provide portable and very small monitoring devices. In the implementation shown in FIG. 2A, FIG. 2B, FIG. 3, and FIG. 4, the reduced size of the monitoring device is achieved by stacking groups of components. In FIG. 5, the reduced size of the monitoring device is achieved by a common fabrication process for all the components. Furthermore, in this monitoring application, the monitoring units are designed not to transmit optical images, an energy-intensive process, but to transmit a decision.

For example, the monitoring device may be placed to monitor a space where intruders would necessarily pass. The optical sensor unit would periodically capture the optical characteristics of the space. When two successive images indicate a change beyond a certain magnitude, the monitoring device will send, not the image, but the result that an intruder has been detected. In the prior art, the captured image would be sent to a monitor, the monitor reproducing the captured image, and an observer would inspect the image to determine whether an intruder was present. Depending on the granularity of the captured image and the sophistication of the program analyzing the image, the control unit may be able to provide the existence of an intruder or possibly the identification of the intruder.

The monitoring devices can be quite small and relatively inexpensive. A number to these devices could be affixed inconspicuously to a wall or ceiling and still have capability of identifying an intruder.

While the power unit can be a battery or even an external connection, in the preferred embodiment, the power unit is implemented with a device using ambient energy. For example, the power unit can be photo-receptor device that converts the optical energy into a storage form. For example, CMOS photo-receptors can be used in this application. In some application the power supply photo-receptor can be combined with the image sensor unit. This implementation could further reduce the size of the control device.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A monitoring device, the device comprising;
   an image sensor unit;
   a processor unit coupled to the image sensor;
   a memory unit coupled to the image sensor unit and the processor unit; wherein the image sensor unit, the processor unit and the memory unit are fabricated in a stack configuration with a lens forming a portion of a transparent dielectric that encapsulates at least a portion of the stack configuration;
   a wireless unit coupled to the processor unit; and
   a power unit coupled to the image sensor unit, the processor unit, the memory unit and the wireless unit, wherein the power unit provides power to the other units.

2. The device as recited in claim 1 wherein the wireless unit is fabricated in the stack.

3. The device as recited in claim 2 wherein power unit is fabricated in the stack.

4. The monitoring device of claim 1, wherein:
   the processor unit and memory unit are operable to compare a first image and a second image from the image sensor unit, and to detect a change between the first image and the second image; and
   the wireless unit is operable to transmit an indication of the change between the first image and the second image instead of transmitting an image.

5. A control unit, the unit comprising:
   an image sensor unit;
   a processor unit coupled to the image sensor unit;
   a memory unit coupled to the image sensor unit and the processor unit;
   a wireless unit; and
   a power unit;
   wherein the image sensor unit, the processor unit, the memory unit, and the wireless unit are fabricated on a common substrate; and
   wherein the image sensor unit, the processor unit, the memory unit, and the wireless unit are encapsulated with a transparent dielectric that forms a lens over the image sensor unit.

6. The control unit as recited in claim 5 wherein the image sensor unit, the processor unit, the memory unit, and the wireless unit are fabricated using the same semiconductor process.

7. The control unit as recited in claim 6 wherein the image sensor unit, the processor unit, the memory unit, and the wireless unit are fabricated using the CMOS semiconductor process.

8. A method for providing an optical image acquisition and information transmission system having an image sensor unit, a processor/memory unit, a wireless unit, and a power unit, the method comprising:
   fabricating at least an image sensor unit and a processor/memory unit in a stack;
   encapsulating at least the image sensor unit and processor/memory unit with a transparent dielectric with a lens formed in a portion of the transparent dielectric over the image sensor unit;
   coupling a wireless unit to the stack for transmitting processed image data.

9. The method as recited in claim 8 further comprising fabricating the wireless unit as part of the stack.

10. The method as recited in claim 9 further comprising fabricating the battery unit as part of the stack.

11. The method of claim 8, further comprising configuring the processor/memory unit to not transmit images from the image sensor via the wireless unit, but to:

compare a first image and a second image from the image sensor unit;

detect a change between the first image and the second image; and transmit an indication of the change via the wireless unit.

12. The method of claim 8, wherein the wireless unit is for transmitting processed image data that does not include an image.

\* \* \* \* \*